Feb. 2, 1965    G. D. WASHINGTON    3,168,206
TRAILER
Filed Dec. 13, 1962    5 Sheets-Sheet 5

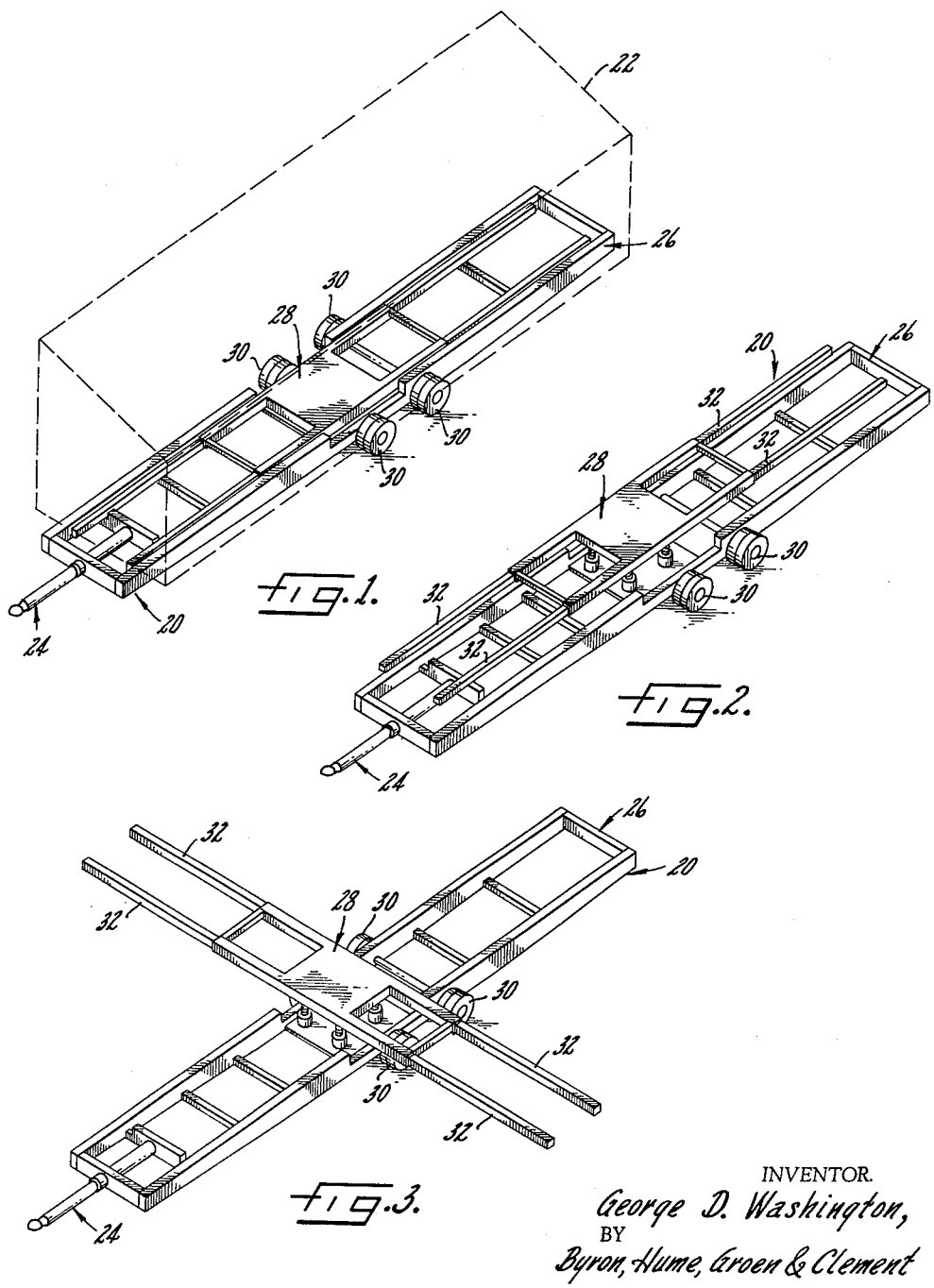

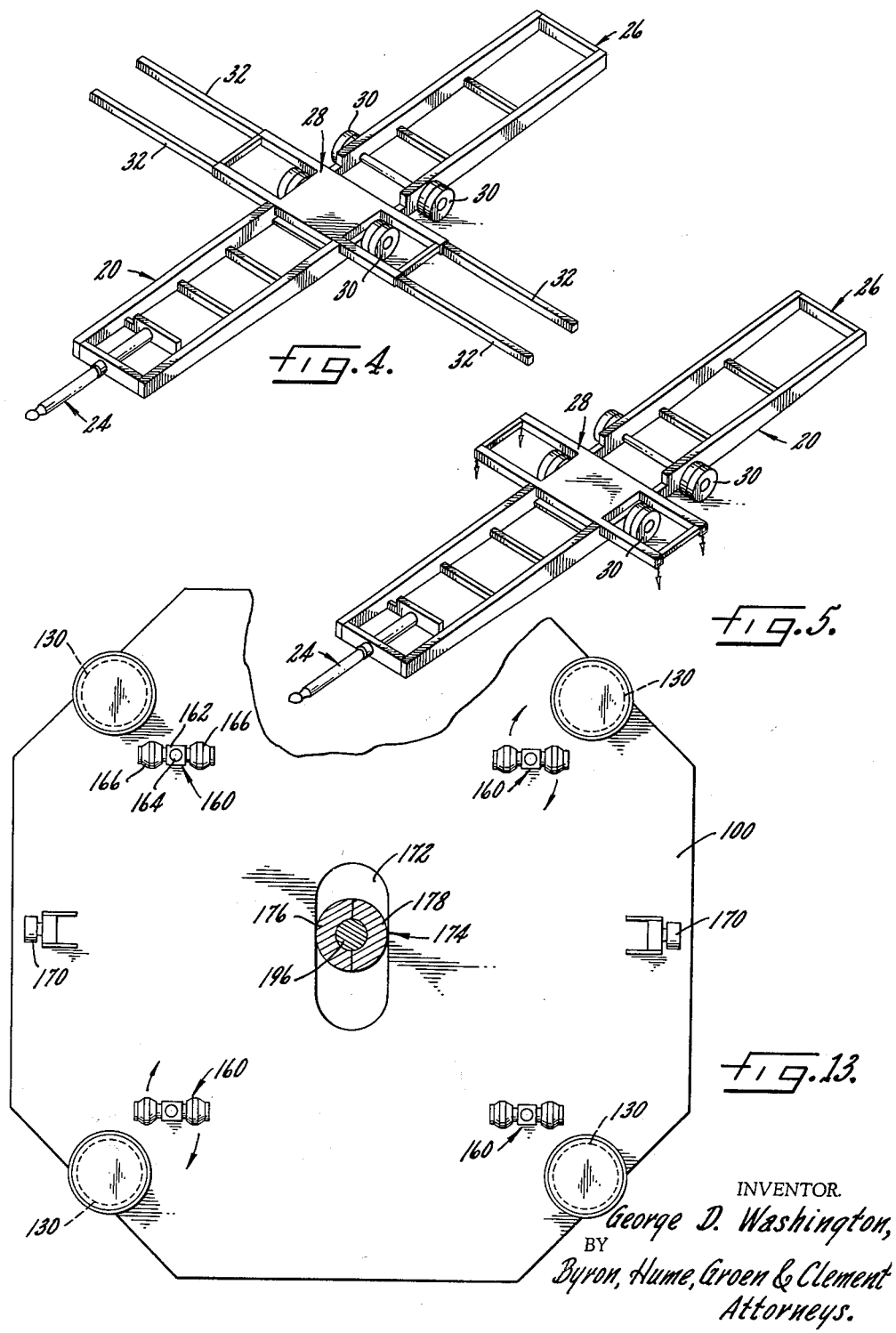

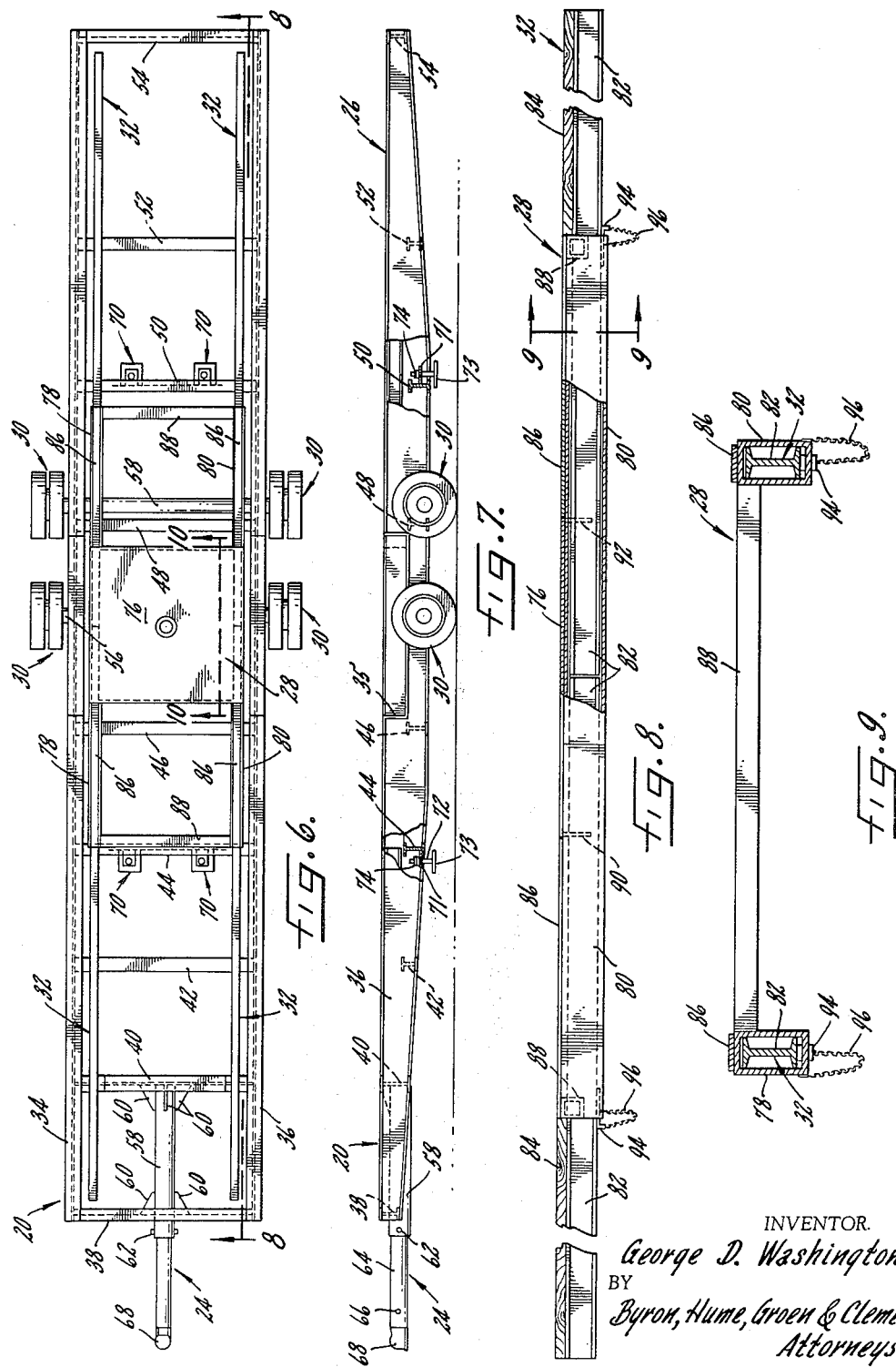

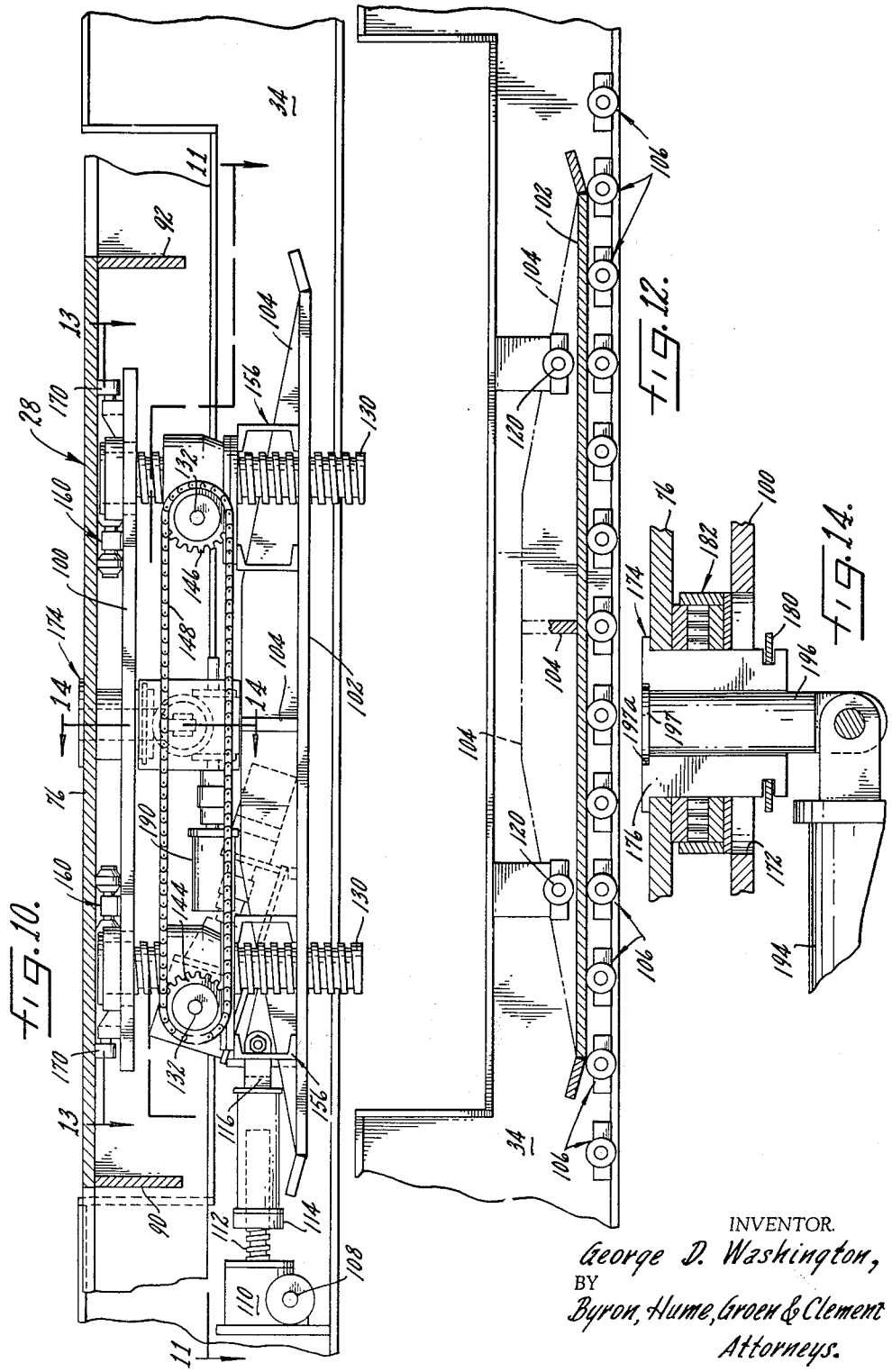

INVENTOR.
George D. Washington,
BY
Byron, Hume, Groen & Clement
Attorneys.

United States Patent Office 3,168,206
Patented Feb. 2, 1965

3,168,206
TRAILER
George D. Washington, Lafayette, Ind., assignor to National Homes Corporation, Lafayette, Ind., a corporation of Indiana
Filed Dec. 13, 1962, Ser. No. 244,341
11 Claims. (Cl. 214—512)

This invention relates to a trailer, and more particularly, to a trailer for transporting and positioning a prefabricated house section.

The concept of prefabricating a sectionalized house is well known in the art. In this building technique an entire house is prefabricated in sections at the factory and the house sections shipped to the site, mounted upon a foundation and attached to one another to form a house ready for occupancy. This method of building homes has not, however, been exploited on a large scale, since suitable means to transport the individual house sections have not been available. Specifically, when constructing homes in this manner with two prefabricated half-house sections, suitable means to transport the half-house sections to the home site and to expeditiously place the sections in proper position on the foundation have heretofore not been available.

It is therefore an object of the present invention to provide means for transporting a house section, said means being adapted to place the house section on a foundation or the like at the home site.

It is still another object of the present invention to provide a trailer for transporting a load, said trailer being adapted to move said load in a vertical direction and to allow said load to be pivoted with respect to said trailer so that the load may be set down in any desired position.

It is a further object of the present invention to provide a trailer which may be pulled by a tractor, cab and the like, said trailer being adapted to transport a house section to the home site and position said house section on a foundation or the like at the home site.

It is still another object of the present invention to provide such a trailer which is adapted to move the house section vertically and to allow the house section to be pivoted so that the house section may be properly positioned on the foundation.

It is another object of the present invention to provide a trailer to transport a half-house section, said trailer being adapted to raise and lower said half-house section and to allow said half-house section to be pivoted with respect to said trailer so that said half-house section may be set upon a foundation or the like in any desire position.

It is still another object of the present invention to provide a trailer to transport and position a half-house section, said trailer being adapted to raise and lower said half-house section, to allow said half-house section to be pivoted so as to be transverse with respect to said trailer, and to move said house slightly in said transverse direction whereby said house may be lowered onto a foundation or the like in proper position.

These and other objects more apparent hereinafter are accomplished by the trailer embodying the features of the present invention. The trailer of the present invention is adapted to transport a load, raise and lower the load, and allow the load to be pivoted to any desired position with respect to said trailer so that the load may be unloaded in the desired position. The load may be moved so as to be transverse with respect to said trailer and moved slightly in the transverse direction to properly position it for unloading. The trailer of the present invention is particularly adapted to transport, support and position a section of a house, and more particularly a half-house section.

The invention, both as to its organization and method of operation, taken with further objects and advantages thereof, will be understood by reference to the following description taken in conjunction with the accompanying drawings, in which:

FIGURE 1 is a perspective view of a trailer embodying the features of the present invention, the trailer being illustrated while supporting a half-house section indicated in phantom;

FIGURE 2 is a perspective view of a trailer of FIGURE 1 with the pivot plate assembly of the trailer raised;

FIGURE 3 is a perspective view of the trailer of FIGURE 1 wherein the pivot plate assembly has been pivoted so that it is substantially transverse to the main frame of the trailer;

FIGURE 4 is a perspective view of the trailer of FIGURE 1 wherein the pivot plate assembly has been lowered while substantially transverse to the main frame of said trailer;

FIGURE 5 is a perspective view of the trailer of FIGURE 1 wherein the pivot plate assembly is in its lowered, transverse position with respect to the main frame of the trailer, the extension members of the pivot plate assembly having been removed;

FIGURE 6 is a plan view of the trailer of FIGURE 1;

FIGURE 7 is a side elevational view, partially cut away, of the trailer of FIGURE 1;

FIGURE 8 is an elevation view, partially cut away, of the pivot plate assembly of the trailer of FIGURE 1 taken along line 8—8 of FIGURE 6;

FIGURE 9 is a cross-sectional view of the pivot plate assembly taken along line 9—9 of FIGURE 8;

FIGURE 10 is a cross-sectional view of the trailer taken along line 10—10 of FIGURE 6;

FIGURE 12 is a cross-sectional view taken along line 12—12 of FIGURE 11;

FIGURE 13 is a cross-sectional view of the trailer taken along line 13—13 of FIGURE 10; and FIGURE 14 is a cross-sectional view taken along line 14—14 of FIGURE 10.

Figure 11:
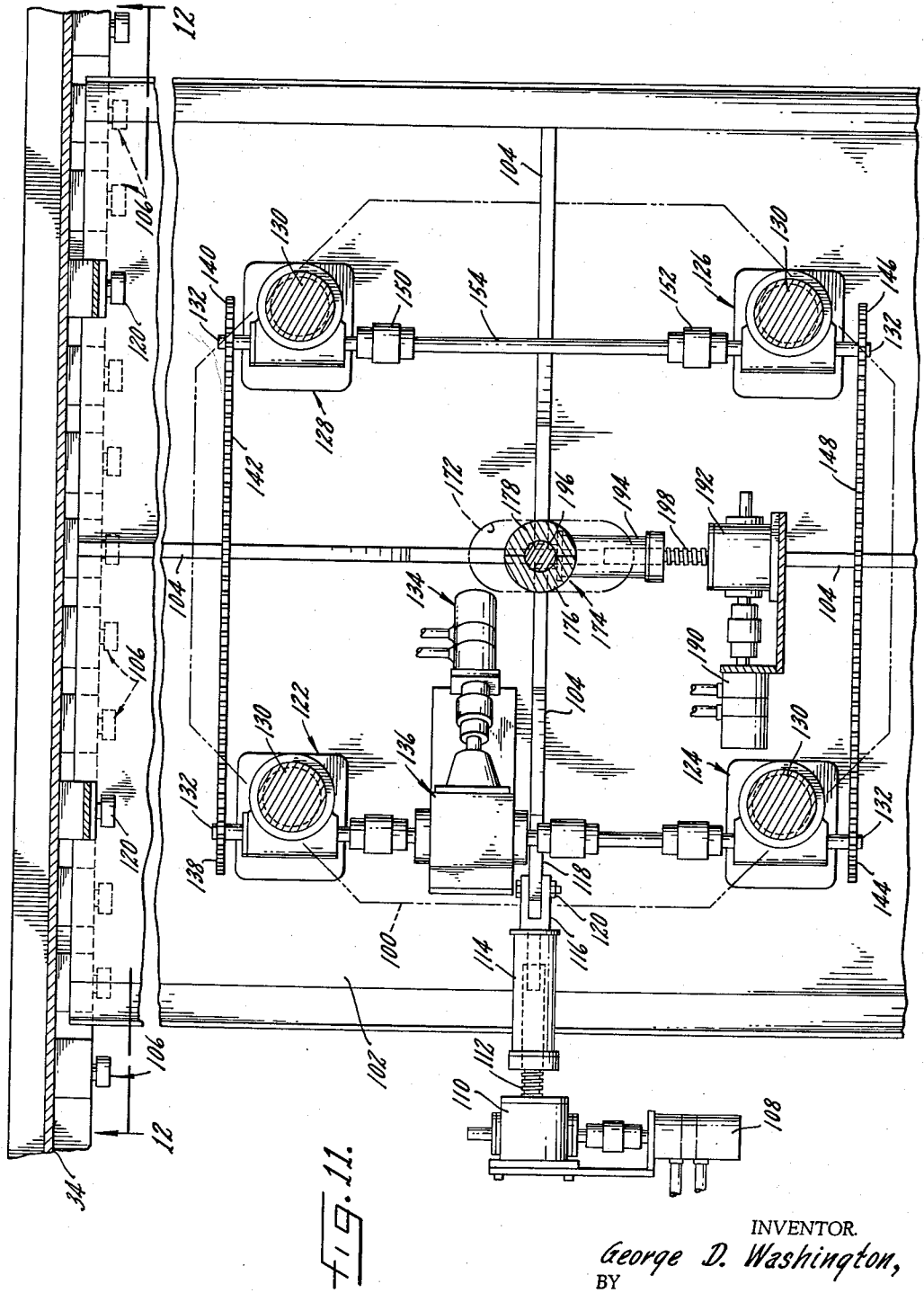
FIGURE 11 is a cross-sectional view of the trailer taken along line 11—11 of FIGURE 10.

Referring to the drawings, and more particularly to FIGURES 1-5, the trailer embodying the features of the present invention is indicated generally by reference numeral 20. The trailer 20 is particularly adapted to transport, as shown in FIGURE 1, a half-house section shown in phantom and indicated generally by reference numeral 22. It will be understood that the trailer 10 may be employed to carry and position loads other than house sections and that its use for house sections, in particular half-house sections, is merely a preferred embodiment of the present invention. The trailer 20 is adapted to be hauled by a tractor, cab and the like (not shown) and to these ends has a tongue or hitch assembly, indicated generally by reference numeral 24, to attach the trailer 20 to the cab or the like.

The trailer 20 includes a main frame, indicated generally by reference numeral 26, and a pivot plate assembly, indicated generally by reference numeral 28. The main frame 26 has secured thereto a pair of axles each of which have dual wheels 30 mounted thereon at their ends so that the trailer 20 is mobile and substantially non-tiltable, as will be readily apparent to one with ordinary skill in the art. When the half-house section 22 is being transported by the trailer 20, the half-house section 22 rests upon the pivot plate assembly 28 and the main frame 26. The trailer 20 is adapted to raise and lower the half-house section 22 and to allow the half-house section 22 to be pivoted on the trailer 20 when the pivot plate assembly 28 has been raised sufficiently to clear the main frame 26.

To these ends, the pivot plate assembly 28 may be moved vertically as shown in FIGURE 2 to raise the half-house section 22 (not shown). When the pivot plate assembly 28 has been raised above the main frame 26, the half-house section 22 is supported solely by the pivot plate assembly 28. The trailer 20 may then be moved to position the half-house section 22 over the foundation and the pivot plate assembly 28 lowered to place the half-house section 22 on the foundation. Likewise, when the pivot plate assembly 28 has been raised sufficiently to clear the main frame 26, the half-house section 22 and the pivot plate assembly 28 may be pivoted manually so that they are transverse to the longitudinal axis of the main frame 26, as shown in FIGURE 3, and the half-house section 22 placed in this position on the foundation by lowering the pivot plate assembly 28 while transverse to the main frame 26 as shown in FIGURE 4. The pivot plate assembly 28 includes extension members 32 detachably mounted on the pivot plate assembly 28. When the half-house section 22 has been lowered onto a foundation in this transverse position the extension members 32 may have to be removed, as shown in FIGURE 5, in order to allow the trailer to be withdrawn from the foundation and from beneath the half-house section 22.

The manner in which the pivot plate assembly 28 is mounted for vertical, as well as pivotal, movement will be more apparent hereinafter. Furthermore, as will be more apparent hereinafter, the pivot plate assembly 28 is adapted to be moved longitudinally and transversely with respect to the main frame 26 for precise positioning of the half-house section 22 before it is lowered onto the foundation.

The manner in which the trailer 20 is utilized in erecting homes with prefabricated half-house sections 22 is illustrated and discussed in detail in the co-pending application of James Price, Serial No. 244,342, filed December 13, 1962, and assigned to the assignee of the present invention. Suffice it to say that the trailer 20 may be backed into a foundation so that the longitudinal axis of the trailer 20 is substantially aligned with the transverse axis of the foundation, the half-house section 22 raised by raising the pivot plate assembly 28, the half-house section 28 pivoted so as to be aligned with the longitudinal axis of the foundation by pivoting the pivot plate assembly 28, and the section 22 placed on the foundation by lowering the pivot plate assembly 28 as shown in FIGURE 4. It will be understood that the trailer 20 may be used to transport and position a myriad of other loads, such as lumber and the like, whether or not they are to be unloaded in a longitudinal or transverse position with respect to the main frame 26 of the trailer 20.

Referring to FIGURES 6–14, the trailer 20 will be described in greater detail. As shown in FIGURES 6 and 7, the main frame 26 comprises two longitudinally extending side members 34 and 36 and a plurality of transversely extending frame members 38, 40, 42, 44, 46, 48, 50, 52 and 54. The side members 34 and 36 are suitably secured to the transversely extending frame members by welding or other suitable means to form the rigid main frame 26. The transversely extending frame members 38, 40, 42, 44, 46, 48, 50, 52 and 54 and the side members 34 and 36 are I-beams in this instance, but it will be understood that channel irons or other suitable structural members may be employed for this purpose. The side members 34 and 36 have two transversely extending axles 56 and 58 attached thereto, these axles each having a pair of wheels 30 mounted on their ends upon which the trailer 20 rides.

As seen in FIGURE 7, for example, the side members 34 and 36 have recesses 35 therein which are aligned with one another to receive the pivot plate assembly 28 when it is lowered in its transverse position, as shown in FIGURES 4 and 5. The recesses 35 permit the pivot plate assembly 28 to be lowered sufficiently for the half-house section 22 carried thereon to be set on a foundation or the like and the pivot plate assembly 28 further lowered so that it is free of the half-house section 22. In this manner, the trailer may be withdrawn from beneath the house section 22 once it has been set upon the foundation.

Attached to the front end of the trailer 20 is the hitch assembly 24 (FIGURES 6 and 7) to attach the trailer 20 to a tractor, cab, or the like which moves the trailer 20. The hitch assembly 24 includes a tubular member 58 which is fixedly secured to the transverse frame members 38 and 40 with gussets 60 by welding or the like. The tubular member 58 has at one end thereof a pair of aligned holes through which a pin 62 extends for reasons more apparent hereinafter. Cooperating with the member 58 is a telescoping tubular member 64, one end of which extends into the tubular member 58 and the other end of which has a ball hitch 68 or the like connected thereto for attachment to suitable means on the tractor or cab.

The telescoping member 64 has a plurality of pairs of aligned holes along its length through which the pin 62 may extend. One such pair of holes is illustrated in FIGURE 7 and indicated by reference numeral 66. These holes permit the telescoping member 64 to extend into the member 58 at variable desired distances. For example, generally, the hitch assembly 24 is in an extended position such as illustrated in FIGURES 6 and 7 wherein the telescoping member 64 extends outwardly from the member 58 almost its entire length. In this instance a pair of holes at the far end of the telescoping member 64 is aligned with the pair of holes in the tubular support member 58 and the pin 62 inserted through these aligned holes to secure the telescoping member 64 to the member 58 in this position. If the over-all length of the trailer 20 is to be reduced, which may be desirable, for example, when the trailer is placed on a flat car for shipment by rail, the pin 62 is removed, the telescoping member 64 pushed into the tubular support member 58 until the holes 66 at the front end of the telescoping member 64 align with the holes in the tubular support member 58, and the pin 62 inserted through the aligned holes in the same manner. Thus the hitch or tongue assembly 24 is adapted to be extended variable distances depending upon the circumstances.

It will be understood that any suitable hitching assembly may be employed on the trailer 20 without departing from the spirit and scope of the present invention, as the hitch assembly 24 illustrated and described in detail herein is merely a preferred embodiment of the present invention.

Attached to the transversely extending support members 44 and 50 are clamping means indicated generally by reference numeral 70 and illustrated in FIGURES 6 and 7. Each clamping means 70 includes a bracket 71 fixedly secured in a substantially horizontal position to the respective transversely extending support member. The bracket 71 has a threaded hole therethrough which cooperates with a threaded rod or shaft 72 having a plate 73 secured to its downwardly extending end.

Upon rotation of the shaft 72 the plate 73 is moved upwardly or downwardly and is held in the desired position by the use of a pair of lock nuts 74 or the like threadedly engaging the shaft 72.

The clamps 70 are utilized principally when the trailer 20 is to be shipped by rail on a flat car. Large trailers, such as the trailer 20, may only travel limited distances on the highways by virtue of state highway regulations. As the factory is frequently a great distance from the home site it becomes necessary to ship the trailers, with the half-house sections 22 thereon, by rail to within a short distance of the home site. In such instances one or two trailers 20 are placed on a flat car at or near the factory and shipped by rail to a station close to the home site. There the trailers 20 are removed from the flat car, pulled by a cab or a trailer to the home site, and the half-house sections 22 placed on the foundation. During the transportation of the trailer 20 on the flat car, it is desired to assure that the trailer will not roll off the flat car during shipment. To these ends the shafts 72 of the clamps 70 are rotated until the plates 73 are firmly pressed against a hub (not shown) on the flat car. The hub extends longitudinally the length of the flat car between the wheels of the trailer 20. The bolts 74 are tightened to prevent the plates 70 from moving from this position. In this manner the trailer 20 cannot be tilted or rolled while on the flat car during shipment. The trailer 20 is released by loosening the bolts 74 and rotating the shaft 72 to move the plate 70 upwardly.

The pivot plate assembly 28, when it is in its lowered longitudinally extending position, as shown in FIGURES 6 and 7, is positioned between the side members 34 and 36 and rests upon the transversely extending support members 44, 46 and 48. The pivot plate assembly 28 is adapted to provide additional support for the load carried by the trailer 20, and, in addition, is adapted to raise the load, permit the load to be pivoted if so desired, and place the load on a foundation or other suitable support means. To these ends, the pivot plate assembly 28, as seen in FIGURES 6-9, includes a top pivotal plate 76 which has attached thereto along its sides longitudinally extending hollow frame members 78 and 80. The top pivot plate 76 and the hollow frame members 78 and 80 are attached by welding or other suitable means. As shown in FIGURE 9, the hollow frame members 78 and 80 are adapted to telescopically receive at each end extension members 32, which in this instance comprise I-beams 82 having secured to the top thereof strips of plywood or other suitable material to raise the upper level of the extension member 32 so that it is substantially coplanar with the top of the pivot plate 76. Likewise, steel plates 86 or the like are welded to the top of the ends of the support members 78 and 80 so that the top of the pivot plate 76, the top of the plates 86, and the top of the wooden strips 84 are substantially coplanar and thus provide a level surface for supporting the load. Transversely extending support members 88 are provided across the free ends of the support members 78 and 80, and secured thereto by means of welding or other suitable means, to provide additional rigidity to the pivot plate assembly 28. Further support for the pivot plate assembly is provided by transversely extending plates 90 and 92 (FIGURE 8) which are welded to the top pivot plate 76 and the hollow support members 78 and 80.

One end of each I-beam 82 extends into its respective hollow support member 78 or 80. The I-beams 82 are held therein by wedges 94 (FIGURES 8 and 9) which are hammered or otherwise driven between the I-beam 82 and the hollow support member and prevent the I-beam 82 from inadvertently sliding out of the support members 78 and 80. If it is desired to remove the extension members 32 from the support, the wedges 94 are pulled out from between the I-beams 82 and their respective hollow support members 78 and 80. This is generally necessary to allow the trailer to be withdrawn from beneath the half-house section 22 when the half-house section 22 has been placed upon the foundation in a position substantially transverse to the longitudinal axis of the trailer 20.

It will be understood that the extension members 32 may be channel irons, or other suitable structural members, and that I-beams are merely exemplary. Chains 96, one end of which is attached to the particular support member and the other end of which is attached to the wedge 94, are provided so that the wedges 94 are not lost or misplaced when they are not being used to hold the extension members 32 in position.

As mentioned hereinbefore. the pivot plate assembly 28 may be moved upwardly and downwardly and is pivotally mounted upon the main frame 26. In addition, the pivot plate assembly 28 is also adapted to be moved longitudinally and transversely with respect to the main frame 26 of the trailer 20. To these ends, and as shown in FIGURE 10, the pivot plate assembly 28 is supported on a lifting plate 100 which is in turn supported by a sled member 102. The sled member 102, as illustrated in FIGURES 10-12, is a plate of steel or other suitable material having criss-cross reinforcing web members 104 suitably secured thereto by welding or the like. The web members 104 provide additional support for the sled member 102 which, in effect, supports the entire weight of the load when the pivot plate assembly 28 has been raised to lift the load above the main frame 26. The sled member 102 is supported at its sides by two rows of roller members 106 secured to the side members 34 and 36 of the main frame 26 by welding or other suitable means. In this manner the sled member 102, and therefore the pivot plate assembly 28, may be moved longitudinally with respect to the main frame 26.

Longitudinal movement of the sled member 102 is effected through a hydraulic motor 108 which is operatively connected to a screw jack 110 as seen in FIGURE 11. The screw jack 110 has a threaded shaft 112 threadedly engaging a coupling 114 so that rotation of the threaded shaft 112 causes the coupling 114 to move toward the left or right depending upon the direction of rotation of the shaft 112. The coupling 114 is connected by a fork member 116 to a plate 118 by means of a nut and bolt assembly 120. The plate 118 is welded or otherwise suitably attached to the web 104 of the sled member 102. In this manner actuation of the hydraulic motor 108 by hydraulic means (not shown) causes the screw jack 110 to be actuated and the threaded shaft 102 to thereby rotate so that the sled member 102 is moved longitudinally toward the front of the trailer or towards the rear of the trailer depending upon the actuation of the hydraulic motor 108.

In addition, a pair of roller members 120 are mounted on each side member 34 and 36 and bear down on the sled 102 to prevent askew movement of the sled 102 as it is moved forward and backward by the force of the hydraulic motor 108.

Fixedly mounted on the sled 102 are four screw jacks indicated generally by reference numerals 122, 124, 126 and 128. Each of these screw jacks has threaded, upwardly extending shafts 130, the tops of which are received by bearing hubs 132 fixedly secured to the lifting plate 100. Each of the screw jacks 122, 124, 126 and 128 have a shaft 132 which upon rotation causes the shaft 130 of the respective screw jacks to move upwardly or downwardly depending upon the direction of rotation of the shaft 132. This, in turn, causes the lifting plate 100 to move upwardly or downwardly with corresponding movement of the pivot plate assembly 28.

The screw jacks 122, 124, 126 and 128 are driven by a hydraulic motor indicated generally by reference numeral 134. The hydraulic motor 134 is connected to a mitre box 136, which are well known in the art, which is suitably coupled to the shafts 132 of the screw jacks 122 and 124. The shaft 132 of the screw jacks 122 is connected to the shaft 132 of the screw jacks 128 by means of sprockets 138 and 140, and an endless chain 142 cooperating with the sprockets 138 and 140. Likewise the shafts 132 of the screw jacks 124 and 126 are connected by sprockets 144 and 146 and an endless chain 148 associated with the sprockets 144 and 146. In addition, the shafts 132 of the screw jacks 126 and 128 are coupled by couplings 150 and 152 connected to a shaft 154. In this manner, upon actuation by the hydraulic motor 134 the shaft 132 of each of the screw jacks 122, 124, 126 and 128 is caused to be rotated at the same speed whereby all the vertically extending shafts 130 of these screw jacks are moved upwardly or downwardly the same amount to cause corresponding movement of the lifting plate 100 and the pivot plate assembly 28. Accordingly, there is no tendency for the pivot plate assembly 28 or the lifting plate 100 to be tilted as they are raised or lowered.

The screw jacks 122, 124, 126 and 128 are secured to the sled 102 on suitable mountings indicated generally by reference numeral 156 (FIGURE 10). It will be understood that the sled 102 has holes therethrough through which the shafts 130 extend when the shafts 130 move downwardly to lower the pivot plate assembly 28.

Mounted on top of the lifting plate 100 are swivel butterfly roller bearings indicated generally by reference numeral 160. Basically, the bearings 160 include a member 162 pivotally mounted about a pin 164 fixedly secured to the lifting plate 100. The member 162 has a rotatable nylon roller 166 mounted on each end. These roller bearings 160 will therefore pivot about the pin 164 upon rotation of the rollers 166. In addition rollers 170 are also mounted on the top of the lifting plate 100 to assist in effecting transverse movement of the pivot plate assembly 28 with respect to the main frame 26 in a manner more apparent hereinafter. The top plate 76 of the pivot plate assembly 28 rests on the rollers 170 and 166 and the pivot plate assembly 28 is in this manner supported by the lifting plate 100.

The lifting plate 100 has a central, transversely extending slot 172 therein through which extends a pivot pin assembly indicated generally by reference numeral 174 (FIGURES 10, 11, 13 and 14). The pivot plate assembly 28 is pivotable about the pivot pin assembly 174 once it has been raised sufficiently to clear the main frame 26. The pivot plate assembly 28 pivots upon the swivel roller bearings 160 and the rollers 170, in the manner discussed hereinbefore, by manually pushing on the pivot plate assembly 28 or the load secured thereto.

The pivot pin assembly 174 includes a pair of split collar members 176 and 178 (FIGURE 13) which are welded to the top pivot plate 76 and are held together at the bottom by a split locking ring 180. Mounted between the top pivot plate 76 and the support plate 100 (FIGURE 14) is a thrust bearing indicated generally by reference numeral 182. The thrust bearing 182 may be any suitable type known in the art and does not per se constitute a part of the present invention. Attached to the bottom of the support plate 100 is a hydraulic motor 190 and as crew jack 192 which is operatively connected thereto. The screw jack 192 has a threaded shaft 198 threadedly engaging a coupling 194 which is connected to a pivot pin 196. The pivot pin 196 extends upwardly through the split collar members 176 and 178 and is prevented from falling therefrom by an annular flange 197 which fits into an annular groove 197a formed in the split collar members 176 and 178. Upon actuation of the hydraulic motor 190 the threaded shaft 198 of the screw jack 192 is rotated causing the coupling 194 and the pivot pin 196 to move transversely with respect to the main frame 26, the particular direction of transverse movement being dependent upon the direction of rotation of the threaded shaft 198. This causes the pivot plate assembly 28 to correspondingly move in the transverse direction. In this manner, the pivot plate assembly 28 may be moved transversely any desired distance with respect to the main frame 26, the distance of transverse movement being limited by the length of the slot 172 in the lifting plate 100.

It will be understood that the hydraulic motors 108, 134, and 190 described hereinbefore are connected by suitable tubing to a source of pressurized hydraulic fluid, which generally will be positioned on the cab or tractor pulling the trailer 20. Suitable valving (not shown) is, of course, provided so that each of the hydraulic motors may be operated and controlled individually.

It will be further understood that the hydraulic motors employed herein are well known in the art and do not per se constitute part of the present invention. Electric motors or the like could be used to actuate the screw jacks for lifting and longitudinal and transverse movement of the pivot plate assembly 28. Likewise, screw jacks are well known in the art and do not per se constitute a part of the invention, it being understood that hydraulic jacks or other suitable means could be used to lift the shifting plate 100, move the sled 102 and move the pivot pin 196.

While the embodiments described herein are at present considered to be preferred, it will be understood that various modifications and improvements may be made therein and it is intended to cover in the appended claims all such modifications and improvements as fall within the true spirit and scope of the invention.

What is desired to be claimed and secured by Letters Patent of the United States is:

1. A trailer for carrying a prefabricated half-house section or other prefabriacted house section which comprises a main frame assembly having wheels attached thereto, a sled means, means mounted on said main frame assembly to support said sled means, means being adapted to move said sled means longitudinally with respect to said main frame assembly, means mounted on said sled means for raising and lowering a lift plate means, said lift plate means having a plurality of pivotal rollers mounted thereon, a pivot pin means, a pivot plate assembly resting on said pivotal rollers whereby said pivot plate assembly is pivotable with respect to said lift plate means about said pivot pin means, said pivot plate assembly having detachable extension means connected thereto, and means to move said pivot pin means transversely with respect to said main frame assembly whereby said pivot plate assembly is correspondingly moved.

2. The trailer of claim 1 wherein said pivot plate assembly has a collar means attached thereto and cooperating with said pivot pin means whereby pivot plate assembly and said collar means are pivotable about said pivot pin means.

3. The trailer of claim 2 wherein said lifting plate means has a transversely extending slot therein, said pivot pin means and said collar means extending downwardly through said slot, and a bearing means about said collar means between said lifting plate and said pivot plate assembly.

4. The trailer of claim 3 wherein said lifting plate means has second rollers thereon upon which said pivot plate assembly also rests, said second rollers being adapted to rotate in a direction transverse of said main frame assembly.

5. The trailer of claim 4 wherein said means for supporting said sled means includes rollers mounted on said main frame assembly at the sides of said sled means, said sled means resting on said rollers whereby said sled means may be moved longitudinally with respect to said main frame assembly.

6. The trailer of claim 1 wherein said means to move said lifting plate means includes a plurality of screw jacks operatively connected to one another and a motor means for actuating said screw jacks whereby said lifting plate means is level as it moves upwardly and downwardly.

7. A trailer which comprises a main frame assembly having wheels, a sled means mounted on said main frame assembly, means to move said sled means longitudinally only with respect to the main frame, a load support, means pivotally mounting said load support for pivotal movement about a substantially vertical axis on said sled means, means to move said load support vertically with respect to said main frame assembly and sled means, and means supported by said sled means to move said load support and pivotal mounting means transversely with respect to said main frame assembly and sled means.

8. A trailer comprising a main frame assembly having wheels mounted thereon, a sled means, means mounted on said main frame assembly for supporting said sled means, means to move said sled means longitudinally only with respect to the main frame assembly, a load support, means pivotally mounting said load support for pivotal movement about a substantially vertical axis, means to move said load support and pivotal mounting means vertically with respect to said main frame assembly, said vertical movement means being mounted on said sled means, and means supported by said sled means to move said load support and pivotal mounting means transversely with respect to said main frame assembly and sled means.

9. The trailer of claim 8 wherein said load support includes extension members detachably connected thereto.

10. The trailer of claim 8 including a supporting means, said vertical movement means being connected to said supporting means, said load support resting on said supporting means, said load support being pivotable with respect to said supporting means.

11. The trailer of claim 10 wherein said means for supporting said sled means includes rollers mounted on said main frame assembly at the sides of said sled means, said sled means resting on said rollers whereby said sled means may be moved longitudinally with respect to said main frame assembly.

References Cited by the Examiner
UNITED STATES PATENTS

| | | | |
|---|---|---|---|
| 1,910,398 | 5/33 | Ludington | 214—516 |
| 2,004,095 | 6/35 | Hankins et al. | 214—38.20 X |
| 2,659,318 | 11/53 | Steins et al. | 214—512 X |
| 2,782,733 | 2/57 | Ewing | 105—368 |
| 2,786,590 | 3/57 | Edwards et al. | 214—38.10 |
| 2,933,053 | 4/60 | Mellam | 214—38.10 X |
| 3,028,023 | 4/62 | Eckersall | 104—455 X |
| 3,030,074 | 4/62 | Lich | 105—368 |
| 3,095,987 | 7/63 | Sable | 214—38.10 |

FOREIGN PATENTS 821,175  11/51  Germany.

HUGO O. SCHULZ, *Primary Examiner.*
GERALD M. FORLENZA, *Examiner.*